United States Patent [19]

Glöggler

[11] 4,343,263
[45] Aug. 10, 1982

[54] SIDE WALL STRUCTURE FOR AN ANIMAL STALL

[76] Inventor: Martin Glöggler, Memelstrabe 4, D-7910 Neu-Ulm, Fed. Rep. of Germany

[21] Appl. No.: 151,456

[22] Filed: May 19, 1980

[30] Foreign Application Priority Data

May 29, 1979 [DE] Fed. Rep. of Germany ....... 2921821

[51] Int. Cl.³ ........................ A01K 1/00; A01K 29/00
[52] U.S. Cl. ..................................... 119/27
[58] Field of Search ................. 119/11, 13, 14.03, 27, 119/155; 24/73 SP, 73 WT, 265 C

[56] References Cited

U.S. PATENT DOCUMENTS

| 419,296 | 1/1890 | Taylor | 119/27 |
|---|---|---|---|
| 591,792 | 10/1897 | Stitzer | 119/27 |
| 673,703 | 5/1901 | Davis et al. | 119/27 |
| 1,049,090 | 12/1912 | Hoeft | 24/243 B |
| 1,079,166 | 11/1913 | Cramer | 119/27 |
| 2,426,975 | 9/1947 | Roach | 24/243 B |
| 2,714,367 | 8/1955 | Arnold | 119/27 |
| 4,217,860 | 8/1980 | Glöggler | 119/27 |

FOREIGN PATENT DOCUMENTS

| 2808258 | 8/1979 | Fed. Rep. of Germany | 119/27 |
|---|---|---|---|
| 133750 | 1/1979 | German Democratic Rep. | 119/27 |

Primary Examiner—Gene Mancene
Assistant Examiner—Robert P. Swiatek
Attorney, Agent, or Firm—Fleit & Jacobson

[57] ABSTRACT

In an animal stall and, more especially, a cattle stall, in the case of which a side wall element is placed at such a distance over the floor that it is not touched or run up against by the animals when lying down, the free space under the side wall element is taken up by a generally vertically stretching upright belt in the back part of the animal stall between the side wall element and the floor, and furthermore by a longitudinal belt stretched tight and running horizontally forwards from the upright belt towards a feeding trough or the like. The two belts take the form of a letter "T" on its side.

17 Claims, 11 Drawing Figures

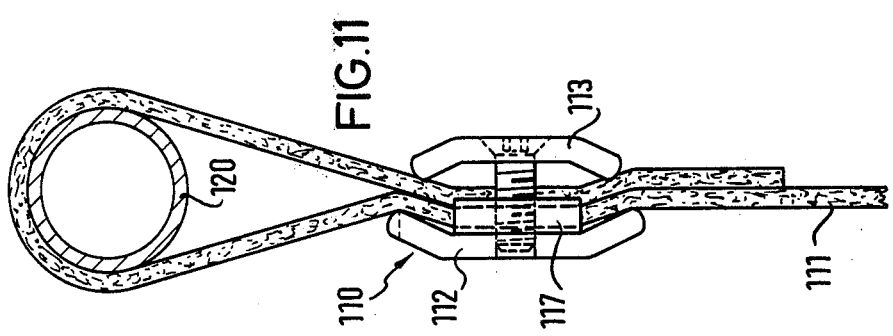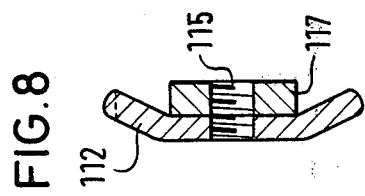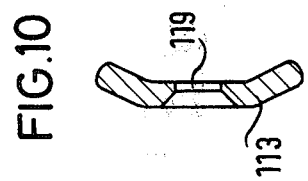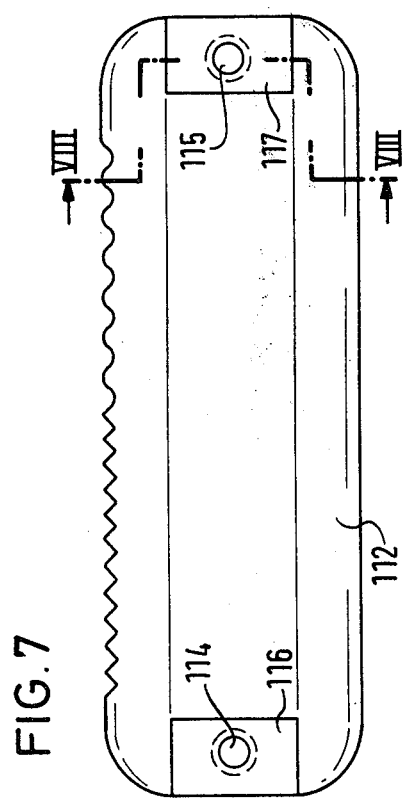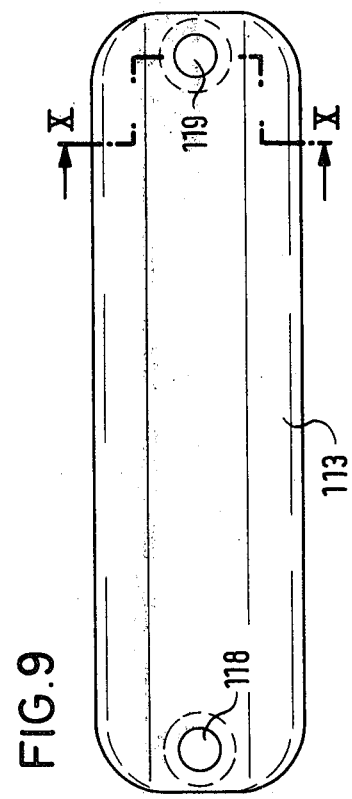

SIDE WALL STRUCTURE FOR AN ANIMAL STALL

The present invention is directed to a side wall structure for an animal stall, where a support, placed in the front part of the animal stall has a backwardly pointing cantilever wall element, spaced from the floor of the animal stall, and between the wall element and the floor at least one strap or belt is placed. The invention is also directed to a novel belt gripping fastener.

The experience of farmers with such side wall structures has made it clear that in the case of animals moving out of the animal stall and of animals of a generally small race, there is a tendency for some of the animals to make an attempt now and again to get into a position at an angle or even into a position in which they are lying across the animal stall. This tendency is furthermore to be seen in the case of young animals. If they get into such a position, it is difficult for such animals to get up from the floor again. In some cases, on getting up, there is overloading of the animal's back legs, this producing swellings on the back leg joints.

The purpose of the present invention is that of designing a side wall structure for an animal stall of the sort which has been noted in detail, such that, even in the case of animals moving out of the animal stall and, in the case of generally short animals, there is no or less danger of their lying down at an angle or right across the animal stall.

Furthermore, the design of the side wall system is to be such that the separating belt may undergo especially simple and quick stepless adjustment and be fixed with a given level of pull or tension.

For effecting this purpose, the present invention is characterized in that an upright belt 38 is positioned vertically towards the back of the animal stall, the belt end, loops around the cantilever round component, which is pressed by a gripping fastener against the part, pulled tight between the components, of the separating belt, and the support, placed in the front part of the animal stall, at least one longitudinal belt 48 is placed which is generally horizontal.

Useful further developments and preferred working forms of the invention will be seen from the dependent claims.

The invention makes it possible for animals moving into the animal stall, particularly small animals, such as young animals, to assume a lying position lined up with the general direction of the animal stall, and on getting up onto their feet again, will not go into any position at an angle to the animal stall. In this way overloading of the back legs and any injuries caused by this are not possible. Because, but for feeding time in the position lined up with the animal stall, the grids are shut, it is not possible for the animals to make a turning motion far enough forwards as they would do naturally if they had enough room for this and in fact they are forced to get used to moving sideways somewhat on getting up. The outcome of this is that, on lying down, they go into a positon somewhat at an angle and to the side in order to have enough room for getting up onto their feet again because getting up is in fact then more readily possible.

Furthermore, farm use has made it clear than an animal stall may be decreased in width by about 10 to 15% without decreasing the animals' comfort. The outcome of this is that a representatively greater number of animals may be put up in a certain space without the comfort of the animals being decreased.

Using the gripping fastener of the invention, no damage is caused to the separating belt or strap so that, even if the belt is frequently pulled tight, its life and strength will not be decreased.

A preferred embodiment of the invention will now be described, by way of example, making use of the figures.

FIG. 7 is a diagrammatic side view of the one gripping fastener.

FIG. 8 is a section on the line VIII—VIII of FIG. 7 through the gripping fastener of this figure.

FIG. 9 is a diagrammatic side view of the other gripping fastener.

FIG. 10 is a section on the line X—X of FIG. 9 through the gripping fastener of FIG. 9.

FIG. 11 is a diagrammatic side view of the separating strap or belt fixedly positioned with the help of a gripping fastener of the present invention.

Figure 1:
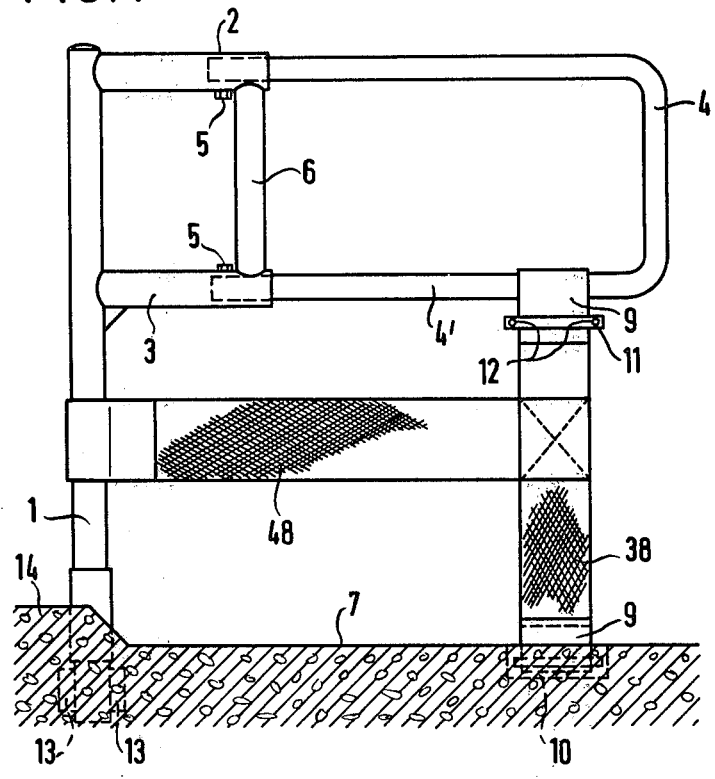
FIG. 1 is a side view of the side wall structure of the invention.

As will be seen from FIG. 1, a side wall system or structure for an animal stall is made up of an upright support means, in this case a hollow post 1, having two hollow connections 2 and 3 for taking up the legs of a cantilever wall element or wing 4. The cantilever wall element 4, comprising a generally horizontal upper and lower member which is generally of U-like form, has its free leg ends pushed into the hollow connections 2 and 3. These ends, taken up by the hollow connections 2 and 3, of the free legs of the wall element 4 are fixed in position by screws 5.

The hollow connections 2 and 3 are joined together by a piece of tube 6 for making this part of the system stronger, the tube 6 being parallel to the upright post 1 and being placed between the ends of the hollow connections 2 and 3.

The hollow post 1 has wings 13 at its lower end embedded in the floor 7 near a feeding trough 14, the wings stopping any twisting of the post 1.

Between the lower leg 4' of the wall element 4 and the floor 7, there is an upright belt 38, made of flexible material. This upright belt 38 has its top end in the form of a loop 9, placed round the lower leg 4' of the wall element 4. The loop may be formed (see FIG. 1) by fixing the end (run around the lower leg 4' of the wall element 4) of the upright belt 38 with the main run of the upright belt 38 using a gripping fastener 11, which may be made in two pieces fastened together by screws 12, as will be made clear later using FIGS. 7 to 11.

At the lower end of the upright belt 38, a loop 9 is formed, which is run around part of a keeper 10 fixed in the floor.

Figure 2:
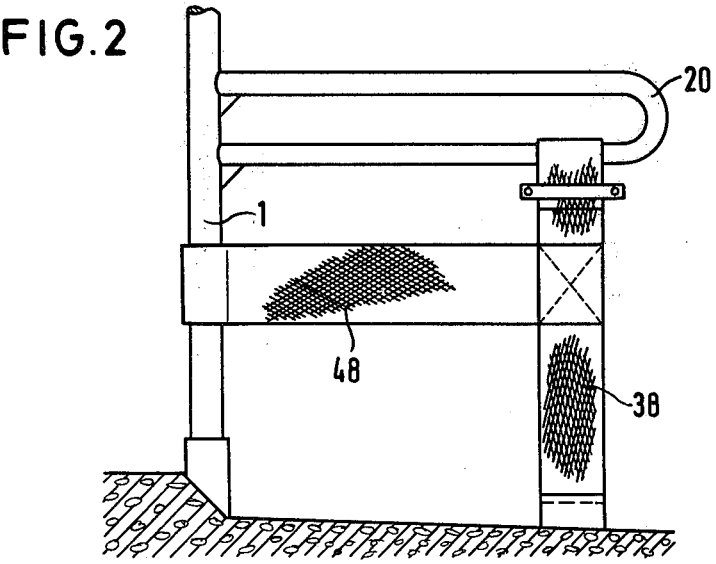
FIG. 2 is a side view of an alternative example of the system of the invention.

In FIG. 2 an alternative working example of the invention is to be seen, in which case a wall element or wing 20 is permanently welded to the hollow post 1.

In each of FIGS. 3 to 6, a preferred form of step is illustrated for preventing the upright belt 38 being pulled forward out of position by the longitudinal belt 48. If no such step were present, acting forces would cause the upright belt 38, to be pulled by the longitudinal belt 48 with the step of the upright belt will only be moved a small amount out of its preferred vertical position, because the upright belt 38 will be automatically pulled tighter dueto the increasing distance between the positions at which it is effectively fixed (when the belt is turned out of its position) and the belt will then become stabilized after a small amplitude.

Figure 3:
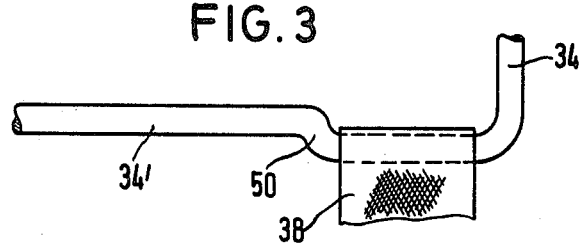
FIGS. 3 to 6 illustrate a step or belt retaining means used for fixing the position of the upright belt.

FIG. 3 is a part side view of a side wall element 34, whose lower leg 34' has an angled part 50. For this reason, the lower leg 34' of the side wall element 34 or wing has a stepped form.

In the case of the forms of the invention to be seen in FIGS. 3 to 6, the design is, in each case, such that the hollow post 1 is placed on the left hand side of the figure and the longitudinal belt 48, fixed to the upright belt 38 will be responsible for a pulling force to the left acting on the upright belt 38, when loaded.

Figure 4:
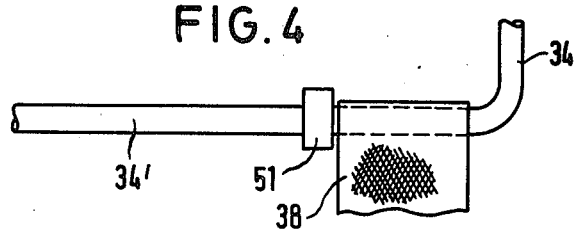

In FIG. 4, a wing or collar 51 is fixed, functioning as a stop, that is to say a step for the upright belt 38.

Figure 5:
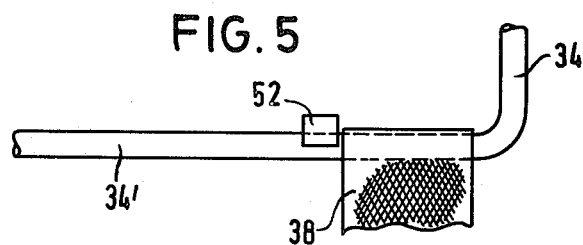

In the further possible form of a step to be seen in FIG. 5, stopping motion of the upright belt 38 out of position to the left is prevented by, a nosepiece 52 placed on the lower leg 34' of the wall element 34. This nosepiece takes the form of a stop or step for positioning the upright belt 38.

Figure 6:
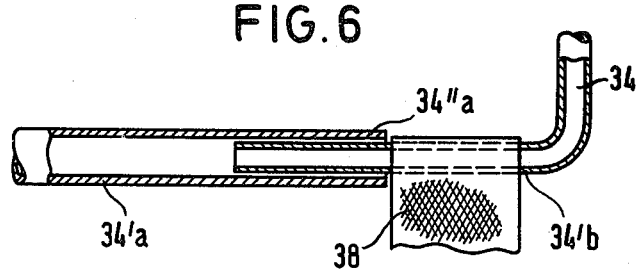

In the case of the form of the invention to be seen in FIG. 6, a tube 34'a (which may be fixed to the post 1) has a thinner tube 34'b pushed into it and in this case the end face 34"a of tube 34'a takes the form of the step for limiting motion of the upright belt 38, which is wrapped round the thinner tube 34'b.

The fixing of the longitudinal belt 48, not only on the upright post 1, but furthermore on the upright belt 38 may be undertaken in a number of different ways and, for example it is possible to have a loop placed round the upright hollow post 1. The loop may be designed and fixed in position on the same lines as is the case with the upright belt 38. Generally speaking, it would furthermore be possible for the longitudinal belt 48 to be joined to the upright belt 38 with the help of a loop. Preferably, however, the design is such that the longitudinal belt 48 is stitched or welded to the upright belt 38. Using this or a like form of join, it is possible to make certain that the longitudinal belt is not moved out of its height position without this being desired.

Generally speaking, it would furthermore be possible to have more than one longitudinal belt between the post 1 and the upright belt 48 and such longitudinal belts may be placed parallel to each other or crossing over or, furthermore, in a V-like line-up.

FIG. 7 is a view of a gripping fastener 112 based on the invention, which, as will be seen from FIG. 11, may be put together with the other gripping fastener 113, to be seen in more detail in FIGS. 9 and 10, so forming the gripping fastener unit numbered 10. The one gripping fastener 112 has, as shown in FIG. 7, generally the form of a plate, whose gripping edges, running across the length-direction of the separating belt 111 to be seen in FIG. 11, are angled off to one side or bent as will be seen from FIG. 8. Because the gripping edges are, in each case, bent round to the same side, on the side facing the separating belt 111, of the gripping fastener 112 there is formed an inwardly curved form or trough. The one gripping fastener 112 may be produced in a generally simple way by bending a flat plate, at the gripping edges in the same direction.

As will be seen from FIG. 7, the one gripping fastener 112 has at the two end parts, which will be sticking out to the sides of the separating belt 111, a threaded holes 114, 115. More especially, if the gripping fastener 112 is made of generally thin sheet metal or other material, it is best for a backing plate 116 and 117 to be placed round the threaded holes 114 and 115, as the reader will see from FIGS. 7 and 8.

In FIGS. 9 and 10 there is a diagrammatic view of the other gripping fastener 113, whose gripping edges are nearer together than the gripping edges of the gripping fastener 112 on the other side of the belt. As will be seen from FIGS. 9 and 10, the other gripping fastener 113 has through-holes 118 and 119 in the end parts, which in the system as seen in FIG. 11 are opposite to the threaded holes 114 and 115.

In FIG. 11 a separating belt 111 will be seen in that position in which it is looped around a component 120 while its lower end is fixed to a further component, not figured. The free end of the separating belt 111, which is at the right in FIG. 11, is gripped on the main run, on the left hand side, of the separating belt 111 by gripping fastener 112 and a further gripping fastener 113 is positioned on the two overlapping separating belt parts and forced together by way of a screw, not figured, so that the separating belt 111 takes on the form illustrated in FIG. 11. Because the separating belt 111 is bent out of a straight line, it is specially strongly gripped.

For increasing the gripping effect of the gripping fasteners still further, the gripping edges may have teeth or be curved inwards and outwards as will be seen in the top part of FIG. 7.

The outer sides of the gripping fastener units 112 and 113 are preferably made outwardly curved and smooth so that there will be no danger of an animal being wounded on running forcefully up against the gripping fastener.

I claim:

1. A sidewall structure for an animal stall comprising:
an upright support means located at a front part of said stall and having a lower end located in a floor of said stall;
a cantilever wall element for defining a sidewall of said stall, supported by support means above the floor at a predetermined height and extending backwardly from said support means to the back of said stall, said cantilever sidewall element including:
a generally horizontal lower member supported by said support means and positionable above said floor at a predetermined height;
a generally horizontal upper member supported by said support means and positioned above said lower member;
a first flexible belt spaced from said support means and extending vertically from said lower member to said floor;
means for fastening a lower end of said first belt to said floor;
means for adjustably fastening an upper end of said first belt to said lower member;
at least one second flexible belt spaced above said floor and below said lower member, extending longitudinally from the support means to said first belt;
means for fastening said at least one second belt to said first belt; and
means for movably fastening said at least one second belt to said support means.

2. The structure of claim 1, wherein the lower member further comprises retaining means for preventing lateral movement of said first belt.

3. The structure of claim 2, wherein the retaining means comprises a portion of the lower member axially displaced from and below the longitudinal axis of the lower member.

4. The structure of claim 2, wherein the retaining means comprises a ring member circumscribing the lower member.

5. The structure of claim 2, wherein the retaining means comprises said lower member formed from a pipe member extending backwardly from said support means and having an open end into which a pipe of smaller diameter is inserted, to define a planar surface for retaining said belt.

6. The structure of claim 2, wherein the retaining means is formed by a nosepiece placed on the lower horizontal member.

7. The structure of claim 1, wherein said upper member and said lower member are interconnected.

8. The structure of claim 7, wherein the upper member and lower member are interconnected to form a U-shaped design.

9. The structure of claim 1, further comprising an upper and lower horizontally positioned pipe socket connected to said support means, said upper horizontal member being insertable into an open end of said upper pipe socket, said lower horizontal member being insertable in said open end of said lower pipe socket.

10. The structure of claim 1, wherein said means for adjustably fastening an upper end of the first belt to said lower member comprises first and second gripping means, each including a longitudinally extending central member, wing members extending longitudinally on either side of said central member to define a trough, a distal edge of each said wing defining a gripping edge, said first gripping means having a distance measured from the distal edge to distal edge greater than the second gripping means, said first gripping means having said distal edges in opposed relationship to said distal edges of said second gripping means and adapted to receive a belt of a width less than the longitudinal length of the central member, and means for securing said first and second gripping means in opposed relationship on either side of said belt.

11. A gripping fastener for a flexible belt comprising first and second gripping means, each including a longitudinally extending central member, wing members extending longitudinally on either side of said central member to define a trough; a distal edge of each said wing defining a gripping edge, said first gripping means having a distance measured from the distal edge to distal edge greater than the second gripping means, said first gripping means having said distal edges in opposed relationship to said distal edges of said second gripping means and adapted to receive a belt of a width less than the longitudinal length of the central member; and means for securing said first and second gripping means in opposed relationship on either side of said belt.

12. The structure of claims 10 or 11, wherein the gripping means is formed by a generally flat square-cornered plate having longitudinal edges bent from planar in the same direction.

13. The structure of claims 10 or 11, wherein the second gripping means is sized such that its gripping edges are forced against the first gripping means at a position at which the central member goes over into the edge parts having the gripping edges, and placed at an obtuse angle to it.

14. The structure of claims 10 or 11, wherein the gripping edges have teeth.

15. The structure of claims 10 or 11, wherein the gripping means are joined together by at least one screw positioned outside the width of the belt.

16. A sidewall structure for an animal stall comprising:
- an upright support means located at a front part of said stall and having a lower end located in a floor of said stall;
- a cantilever wall element for defining a sidewall of said stall, supported by support means above the floor at a predetermined height and extending backwardly from said support means to the back of said stall;
- a first flexible belt spaced from said support means and extending vertically from said cantilever to said floor;
- means for fastening a lower end of said first belt to said floor;
- means for adjustably fastening an upper end of said first belt to said cantilever;
- at least one second flexible belt spaced above said floor and below said cantilever, extending longitudinally from the support means to said first belt;
- means for fastening said at least one second belt to said first belt; and
- means for movably fastening said at least one second belt to said support means.

17. A sidewall structure for an animal stall comprising:
- an upright support means located at a front part of said stall and having a lower end located in a floor of said stall;
- a cantilever wall element for defining a sidewall of said stall, supported by support means above the floor at a predetermined height and extending backwardly from said support means to the back of said stall;
- a first flexible belt spaced from said support means and extending vertically from said cantilever to said floor;
- means for fastening a lower end of said first belt to said floor;
- means for adjustably fastening an upper end of said first belt to said cantilever comprising first and second gripping means, each including a longitudinally extending central member, wing members extending longitudinally on either side of said central member to define a trough, a distal edge of each said wing defining a gripping edge, said first gripping means having a distance measured from the distal edge to distal edge greater than the second gripping means, said first gripping means having said distal edges in opposed relationship to said distal edges of said second gripping means and adapted to receive a belt of a width less than the longitudinal length of the central member, and means for securing said first and second gripping means in opposed relationship on either side of said belt;
- at least one second flexible belt spaced above said floor and below said cantilever, extending longitudinally from the support means to said first belt;
- means for fastening said at least one second belt to said first belt; and
- means for movably fastening said at least one second belt to said support means.

* * * * *